(12) United States Patent
Kekki

(10) Patent No.: US 8,520,510 B2
(45) Date of Patent: Aug. 27, 2013

(54) METHOD AND APPARATUS FOR TRANSPORTING UPLINK CHANNEL DATA IN A COMMUNICATION SYSTEM

(75) Inventor: Sami J. Kekki, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 1211 days.

(21) Appl. No.: 11/176,579

(22) Filed: Jul. 8, 2005

(65) Prior Publication Data

US 2006/0007874 A1 Jan. 12, 2006

(30) Foreign Application Priority Data

Jul. 9, 2004 (GB) .................................. 0415451.4

(51) Int. Cl.
*G06F 11/00* (2006.01)
(52) U.S. Cl.
USPC .......................................... 370/229; 370/431
(58) Field of Classification Search
USPC ................. 370/216, 229, 231, 236, 310, 314, 370/320, 326, 329, 331, 335, 341, 342, 431, 370/441, 458, 464
See application file for complete search history.

(56) References Cited

U.S. PATENT DOCUMENTS

| | | | | |
|---|---|---|---|---|
| 5,317,719 A * | 5/1994 | Rozmovits | | 709/236 |
| 6,101,180 A * | 8/2000 | Donahue et al. | | 370/352 |
| 6,122,264 A * | 9/2000 | Kaufman et al. | | 370/331 |
| 6,259,675 B1 * | 7/2001 | Honda | | 370/248 |
| 6,324,178 B1 * | 11/2001 | Lo et al. | | 370/392 |
| 6,330,435 B1 * | 12/2001 | Lazraq et al. | | 455/412.1 |
| 6,421,350 B1 * | 7/2002 | Szurkowski et al. | | 370/419 |
| 7,013,143 B2 * | 3/2006 | Love et al. | | 455/450 |
| 7,283,502 B1 * | 10/2007 | Abraham et al. | | 370/337 |
| 2001/0055298 A1 * | 12/2001 | Baker et al. | | 370/349 |
| 2002/0009999 A1 | 1/2002 | Lee et al. | | |
| 2002/0015416 A1 | 2/2002 | Lee et al. | | |
| 2002/0021698 A1 | 2/2002 | Lee et al. | | |
| 2002/0082020 A1 * | 6/2002 | Lee et al. | | 455/450 |
| 2002/0154602 A1 * | 10/2002 | Garcia-Luna-Aceves et al. | | 370/230 |
| 2003/0039270 A1 * | 2/2003 | Chang et al. | | 370/469 |
| 2003/0147371 A1 * | 8/2003 | Choi et al. | | 370/341 |

(Continued)

FOREIGN PATENT DOCUMENTS

| | | |
|---|---|---|
| EP | 1 209 940 A1 | 5/2002 |
| JP | 2003-503947 T | 1/2008 |

(Continued)

OTHER PUBLICATIONS

3GPP TS 25.427 V5.3.0, "*3rd Generation Partnership Project; Technical Specification Group Radio Access Network; UTRAN Iub/Iur Interface User Plane Protocol for DCH Data Streams (Release 5)*", XP-002360846, Dec. 2003, pp. 1-35.

(Continued)

*Primary Examiner* — Michael Thier
*Assistant Examiner* — Curtis A Alia
(74) *Attorney, Agent, or Firm* — Squire Sanders (US) LLP

(57) ABSTRACT

A method of transporting data in a dedicated channel of a mobile communication system includes selectively including data in the payload of a frame, and further including in the frame an indication of at least one of the selectively included data and excluded data. The dedicated channel is an enhanced dedicated channel and the data includes data sets or transport blocks.

53 Claims, 3 Drawing Sheets

(56) References Cited

U.S. PATENT DOCUMENTS

| | | | |
|---|---|---|---|
| 2003/0162495 A1* | 8/2003 | Yonemoto et al. | 455/7 |
| 2003/0185175 A1* | 10/2003 | Golitscheck et al. | 370/335 |
| 2003/0210668 A1* | 11/2003 | Malladi et al. | 370/335 |
| 2004/0085924 A1* | 5/2004 | Zhang et al. | 370/328 |
| 2005/0047393 A1* | 3/2005 | Liu | 370/352 |
| 2005/0193315 A1* | 9/2005 | Bertinelli et al. | 714/758 |

FOREIGN PATENT DOCUMENTS

| | | |
|---|---|---|
| KR | 2001-095517 A | 11/2001 |
| KR | 2002-1174 | 1/2002 |
| KR | 2003-20745 | 3/2003 |
| WO | WO 01/03358 | 1/2001 |
| WO | WO 02/069547 A1 | 9/2002 |

OTHER PUBLICATIONS

Korean Office Action for Korean Patent Application No. 7003138/2007 dated Jan. 30, 2008.
Japanese Office Action dated Jun. 4, 2009.
Korean Office Action dated Jun. 23, 2010.

* cited by examiner

METHOD AND APPARATUS FOR TRANSPORTING UPLINK CHANNEL DATA IN A COMMUNICATION SYSTEM

BACKGROUND TO THE INVENTION

1. Field of the Invention

The invention relates to transmissions in an uplink channel in a communication system, and particularly but not exclusively, to an enhanced dedicated channel in a UMTS system.

2. Description of the Related Art

A mobile communication system is an example of a system in which an access network is provided to allow access to the system functionality for user terminals.

In a universal mobile telecommunications system (UMTS), a radio access network typically provides access for user equipment to a mobile communications system core network. The user equipment typically communicates with the access network over a radio interface, the access network including a plurality of Node Bs, or more generally network access points, with which the user equipment establishes a connection. Each of the Node Bs is connected to one or more radio network controllers, or more generally network access controllers.

A dedicated channel (DCH) is provided in a UMTS system for uplink traffic from the user equipment to the radio network controller via the Node B. A frame transmission interval is defined for this channel. A typical and thus far the shortest frame transmission interval for dedicated channel is 10 ms.

In $3^{rd}$ Generation Partnership Project, Technical Specification Group Radio Access Network (3GPP TSG-RAN) there has been proposed high speed uplink packet access, also known in 3GPP as Frequency Division Duplex (FDD) Enhanced Uplink, including an enhanced DCH, E-DCH. This proposal is documented in 3GPP TR25.896.

A proposed functionality of the E-DCH is a hybrid automatic repeat request (H-ARQ) error detection correction mechanism. This error control mechanism is proposed to be implemented in the Node B for uplink packets.

A further proposed characteristic of the E-DCH is to provide a shorter frame transmission interval of 2 ms.

A still further proposed functionality of the E-DCH is to support soft handover (SHO).

SUMMARY OF THE INVENTION

It is an aim of the invention to provide an improved uplink transmission, particularly but not exclusively for the transmission of transport blocks in the enhanced dedicated channel of a UMTS system.

In accordance with the invention there is provided, in a first aspect, a method of transporting data in a dedicated channel of a mobile communication system, comprising selectively including data in the payload of a frame, and further including in said frame an indication of at least one of the selectively included data and excluded data. Preferably the dedicated channel is an enhanced dedicated channel, and preferably the data are data sets or transport blocks.

The step of selectively including data in the payload of the frame preferably includes applying error control to a set of available data, and including in the payload of the frame those data which pass the error control.

The indication of the selectively included data preferably comprises a bit map. The bit map may identify the presence or absence of each available data. The bit map may include a number of bits corresponding to a maximum number of available data.

The indication of the selectively included data may be included in a header of the frame or in an extension of the frame.

The method may further comprise the steps of comparing the indication of the selectively included transport blocks in frames in at least two channels, and combining the common transport blocks as part of a soft handover procedure.

The method further preferably includes a step of transmitting signalling indicating whether the dedicated channel transports selectively included data. This signalling is preferably carried out between the RNC and the NodeB in the process of establishing the enhanced dedicated channel.

Preferably, responsive to an indication that the dedicated channel transports selectively included data, the indication of the selectively included data is retrieved from a transmitted frame at a receiver.

In a further aspect the invention provides a network element of a mobile communication system configured for transporting data in a dedicated channel, the network element including selection means for selectively including data in the payload of a frame, and indication means for further including in said frame an indication of at least one of the selectively included data and excluded data. Preferably the dedicated channel is an enhanced dedicated channel, and wherein the data are data sets or transport blocks.

The selection means may include error control means, the error control means being adapted to apply error control to a set of available data, the selection means being further adapted to include in the payload of the frame those data which pass the error control.

The indication means may include a mapping means, the indication of the selectively included data being a bit map. The indication means may be adapted to generate the bit map in dependence on the presence or absence of each available data. The indication means may be adapted to generate the bit map to include a number of bits corresponding to a maximum number of available data.

The network element may further comprise comparison means for comparing the indication of the selectively included data in frames in at least two channels, and combining means for combining the common data as part of a soft handover procedure.

The network element may further be adapted to include a transmission means for transmitting a signalling support indicating whether the dedicated channel comprises selectively included data.

The network element may comprise a network access point of the communication system. The communication system be a communication defined by, or a derivative of, 3GPP. The network access point is preferably a Node B.

In a still further aspect the invention provides a frame protocol for a dedicated channel including at least a header portion and a payload portion, the payload portion being adapted to carry a variable number of data, the frame being further adapted to include an indication of the payload data.

The dedicated channel is preferably an enhanced dedicated channel, and the data are preferably data sets or transport blocks. The frame protocol is preferably for use in a dedicated channel between a network access point and a network access controller. The communication system is preferably a UMTS system. The network access point is preferably a Node B. The network access controller by a radio network controller or a mobile switching controller.

The indication of the payload data may be included in the header portion of the frame. The frame protocol may further include a spare extension portion, wherein the indication of the payload transport blocks is included in the extension portion. The indication of the payload data is preferably a bit map.

Embodiments of the invention preferably provided means for encoding a frame in accordance with said frame protocol. Said means may comprise an adapted network access point. Embodiments of the invention preferably include means for decoding a frame encoded in accordance with said frame protocol. Said means may comprise an adapted network access controller.

Embodiments of the invention provide a mechanism that can be used in the $I_{ub}$ interface between a target Node B and a controlling radio network controller, and between a controlling radio network controller and a serving radio network controller for a user equipment.

Such embodiments are facilitated by an aspect of the invention in which there is provided a method of combining transport blocks for a soft handover assessment, comprising receiving in at least two enhanced dedicated channels of a mobile communication system a frame including transport blocks in the payload, and an indication, in each channel, of the selectively included transport blocks, the method further comprising the step of determining the transport blocks common to each channel in dependence on the indication of the selectively included transport blocks in each frame, and combining the common transport blocks as part of the soft handover procedure.

BRIEF DESCRIPTION OF THE FIGURES

The invention will now be described by way of example with reference to the accompanying figures, in which.

DESCRIPTION OF THE PREFERRED EMBODIMENTS

The invention is described herein by way of reference to particular example scenarios. In particular the invention is described in relation to elements of a universal mobile communication telecommunications system (UMTS).

Figure 1:
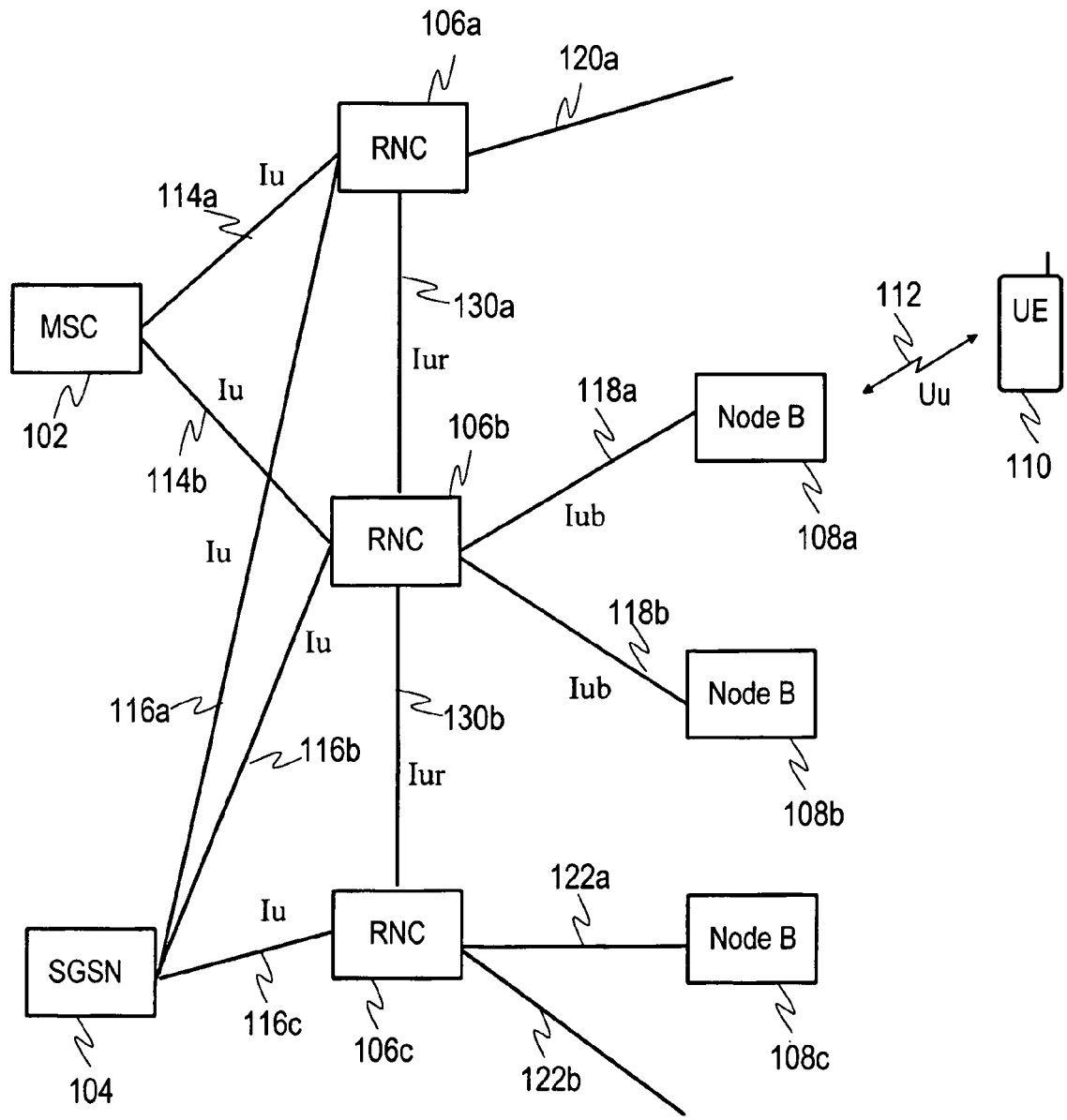
FIG. 1 illustrates elements of a radio access network in which embodiments of the invention may be implemented.

In FIG. 1, there is illustrated those typical elements of a UMTS system necessary for understanding embodiments of the present invention. The implementation of a UMTS system will be well-known to one skilled in the art. As such the system is not described in detail herein, but only sufficient elements shown and described as is necessary for an understanding of the invention.

Referring to FIG. 1, an example UMTS system typically includes a mobile switching centre (MSC) 102, a serving GPRS support node (SGSN) 104, a plurality of radio network controllers (RNCs) 106a, 106b, 106c, a plurality of Node Bs 108a, 108b, 108c, and at least one user equipment (UE) 110.

In practice, the MSC functionality may be provided by an MSC Server (MSS) and a Media Gateway (MGW).

As is known in the art, the at least one user equipment 110 connects with one of the Node Bs, for example Node B 108a, over a radio interface 112, known in the 3GPP UMTS system as a $U_u$ interface.

Each Node B is connected to at least one RNC via an $I_{ub}$ interface. The RNC 106b connects to the Node Bs 108a and 108b via $I_{ub}$ interfaces 118a and 118b respectively, and possibly to one or more other Node Bs. The RNC 106c connects to the Node B 108c via $I_{ub}$ interface 122a, and to one or more other Node Bs via one or more other $I_{ub}$ interfaces, such as interface 122b. The RNC 106a connects to one or more Node Bs via one or more $I_{ub}$ interfaces, such as interface 120a. Various RNCs may connect to various Node Bs, as known in the art.

The RNCs themselves are interconnected via $I_{ur}$ interfaces. In FIG. 1, it is shown that the RNC 106a is connected to the RNC 106b via an $I_{ur}$ interface 130a, and the RNC 106b is connected to the RNC 106c via an $I_{ur}$ interface 130b. The RNCs 106a and 106c may similarly be interconnected via an $I_{ur}$ interface. The various RNCs may be interconnected via $I_{ur}$ interface.

Each of the RNCs in the UMTS system is connected to one or more MSCs or SGSNs via an $I_u$ interface. In the example of FIG. 1, the MSC 102 is connected to the RNCs 106a and 106b via respective $I_u$ interfaces 114a and 114b, and the SGSN 104 is connected to the RNCs 106a, 106b and 106c via respective $I_u$ interfaces 114a, 114b and 114c.

It has been proposed, in 3GPP TSG-RAN, for a new enhanced DCH uplink transport channel. The DCH uplink transport channel is a channel for transporting traffic from a user equipment to a Node B in the radio interface $U_u$, and for transporting traffic from a Node B to an RNC, and between RNCs, on the $I_{ub}$ interface or the $I_{ur}$ interface. Embodiments of the invention propose various improvements and enhancements to the enhanced DCH.

Embodiments of the invention propose, in combination with the proposal for the enhanced DCH uplink transport channel, to utilise a hybrid automatic repeat request (H-ARQ) error control mechanism in the various Node Bs. In particular, the H-ARQ functionality is proposed, in embodiments, to configure the frame protocol packet data units (PDUs) on the $I_{ub}$ interface to convey only those transport blocks (TBs) that are determined to be useful. Thus, it is proposed that those transport blocks that the H-ARQ error control is not able to correct are not sent over the $I_{ub}$.

Thus, embodiments of the invention adapt the transmission in the uplink channel between a Node B and a radio network controller to transfer only those transport blocks which pass the error control applied.

In a further enhancement, a new information element is introduced in the frame protocol (FP) frame. This information element, which may be termed a "transport block bit map", indicates the transport blocks of the transmission time interval (TTI) that are included in the given frame. Based on the information in the bit map the radio network controller receiving a packet data unit (PDU) can identify whether a transport block of a given transport format is included in the frame or not.

By excluding transport blocks which fail error control on the $I_{ub}$ interface, the transmission bandwidth on this interface can be significantly saved. The frame protocol frame may have a variable length, depending upon the transport blocks included therein, which provides a variability in the offered load of the $I_{ub}$ interface. The statistical multiplexing gain in the $I_{ub}$ transport interface is thus increased.

Figure 2:
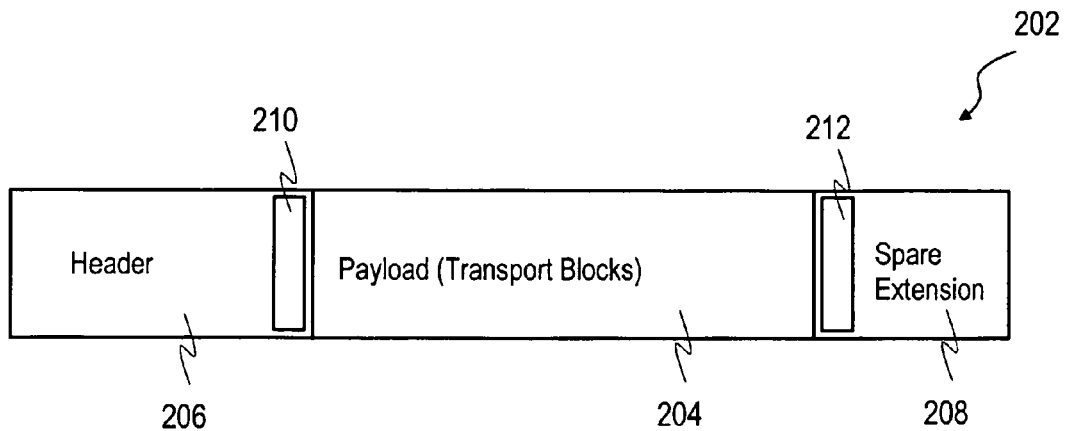
FIG. 2 illustrates an adaptation of a frame in embodiments of the invention.

With reference to FIG. 2 there is illustrated possible implementations of the transport block bit map in accordance with embodiments of the invention in the frame protocol frame. The frame protocol frame is generally identified in FIG. 2 by reference numeral 202, and includes a header portion 206, a payload portion 204, and a spare extension portion 208. The payload portion 204 includes the transport blocks.

In one embodiment the transport block bit map is preferably included in the header portion 206, as denoted by reference numeral 210. This proposed embodiment is suitable for implementation in the enhanced DCH frame protocol.

In a second embodiment it is proposed to include the transport block bit map in the spare extension 208, as denoted by reference numeral 212. This second alternative is backwardly compatible with the existing DCH frame protocol. As the use of H-ARQ is introduced in the proposal for E-DCH, the use of the existing protocol is likely to be where an E-DCH is provided. Embodiments of the invention in its general sense, however, are not limited to the enhanced version of the DCH, although they find particular utility in such an environment.

Thus, in accordance with embodiments of the invention, the inclusion of transport blocks in the payload portion 204 is in dependence on the outcome of error control performed in the Node B. Only those transport blocks successfully undergoing error control are included in the payload 204. The transport block bit map, either 210 or 212 respectively included in the header portion 206 or spare extension portion 208, indicate which transport blocks are included in the payload portion 204. The payload portion 204 is therefore preferably of variable length, such that the frame protocol frame 202 is a variable length. In an alternative, however, the payload portion 204 and the frame protocol frame 202 may be of fixed length, with some of the payload portion 204 being empty.

It should be noted that whilst embodiments of the invention may particularly advantageously be applied where error control, for example H-ARQ, is applied, embodiments of the invention may apply generally to any environment where some mechanism for selectively including data or data sets, such as transport blocks for example, in a frame or packet is provided.

In the frame structure of the existing Frame Protocol frame a spare extension field is defined for any future additions. The use of the Spare Extension allows the inclusion of new information in the frame in a backward compatible way. That is, the earlier versions of the receiver implementation not supporting the feature related to the new information are able to ignore the new information if it is placed in the spare extension.

Figure 3:
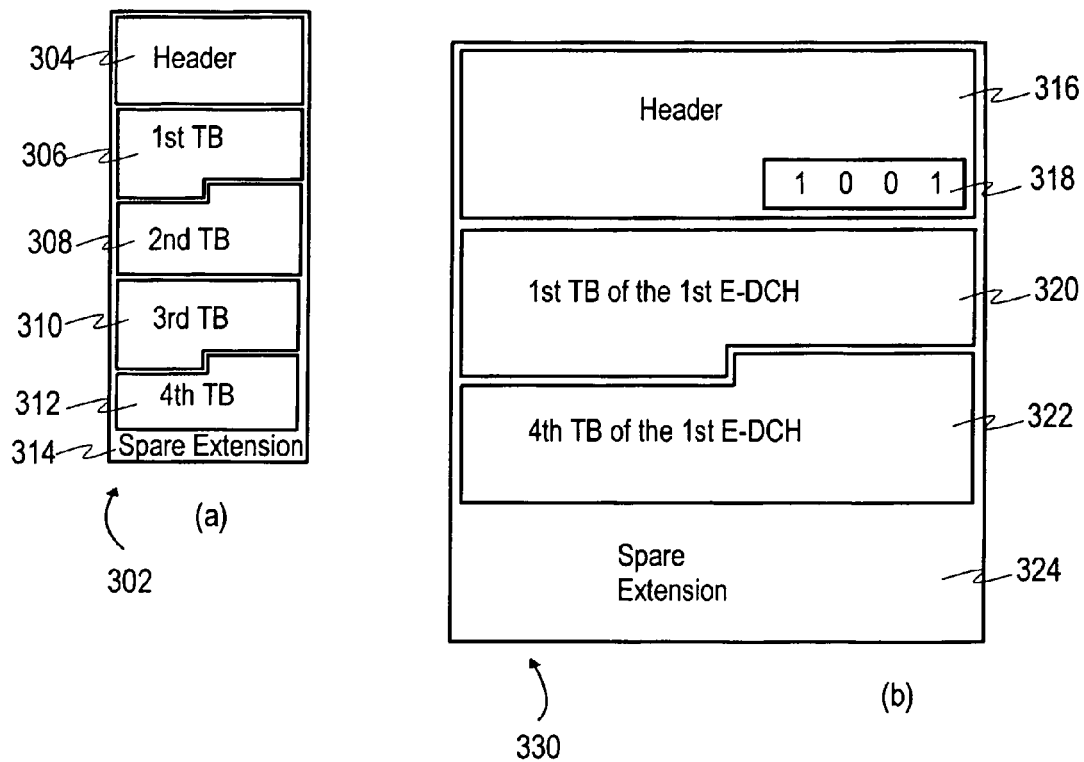
FIG. 3 illustrates a comparison of a frame in accordance with an embodiment of the invention and a prior art frame.

With reference to FIG. 3, the use of the transport block bit map in accordance with an embodiment of the invention is described in more detail. The embodiment described with reference to FIG. 3 is that which is not backwardly compatible, assuming an enhanced DCH frame protocol, and assuming that the transport block bit map is included in the header of the frame protocol frame.

In FIG. 3 there is illustrated the structure of a frame protocol frame without implementation of the principles of the present invention. The frame protocol frame 302 includes a header 304, a first transport block 306, a second transport block 308, a third transport block 310, a fourth transport block 312 and a spare extension portion 314. The transport blocks 306, 308, 310, 312 comprise the payload of the frame protocol frame 302. For the purposes of an example, it is assumed that the first and fourth transport blocks successfully pass error control, preferably implemented by a H-ARQ entity, whilst the second and third transport blocks fail the error control, and are therefore declared as not useful. It can be seen that in the context of FIG. 3a, the frame protocol frame 302 thus transmits two transport blocks which are not useful and which cannot be used.

In accordance with the principles of the invention, therefore, as illustrated in FIG. 3b, the frame protocol frame 330 is modified, and includes a header 316, the first transport block of the first E-DCH denoted 320, the fourth transport block of the first E-DCH denoted 322, and a spare extension portion 324. In addition, the header 316 is adapted to include the transport block bit map 318. Preferably the transport block bit map has a number of bits directly corresponding to the maximum number of transport blocks which may be transported for the given dedicated channel in a frame protocol frame. In the present example, it is assumed that the maximum number is 4. Thus, the transport block bit map 318 is a 4-bit sized map. It is assumed, by way of example, that a bit 1 is used to represent the presence of a transport block, and the bit 0 is used to indicate the absence of a transport block. As in the example of FIG. 3b the $1^{st}$ and $4^{th}$ transport blocks only are included, then the bit map 318 includes the bit sequence 1001.

It will be understood by one skilled in the art that the formulation of the bit map may vary. It is possible, for example, that further encoding may be applied to a simple bit sequence such as that described above.

The error control mechanism applied in a Node B is outside the scope of the present invention. It is noted that it is currently proposed in the context of the enhanced DCH that a H-ARQ error control mechanism may be applied. The invention is not limited to any specific error control mechanism. The invention may be used in combination with any technique which facilitates the selective inclusion of transport blocks in the frame protocol frame. Where transport blocks are selectively included, the invention allows for an indication of the selected transport blocks to be given. The invention is not necessarily limited to the inclusion of transport blocks in the payload, but may more generally relate to the inclusion of any form of data or data sets in a payload.

The principles of the present invention may be advantageously applied in soft handover (SHO) situations. Soft handover allows for radio links to be added and removed in a way such that the user equipment always maintains at least one radio link with the radio access network. Soft handover is performed by means of macro diversity, which refers to a condition where several radio links are active at the same time. The active radio links for a soft handover are generally known as soft handover branches. Two or more soft handover branches may terminate in the same radio network controller.

Where two or more soft handover branches terminate in the same radio network controller, the bit map proposed for embodiments of the present invention may be used to assist in soft handover. Specifically, based on the information carried in the transport block bit map in the DCH or enhanced DCH of each branch, the macro diversity combining (MDC) entity within the radio network controller used for soft handover may determine the transport blocks that are available for the combining process necessary to perform soft handover. The combining process can only be carried out for those transport blocks which are common to the two or more soft handover branches. This principle is further described with reference to FIG. 4.

With reference to FIG. 4, it is again assumed, as for FIG. 3, that the maximum number of transport blocks which may be included in the frame protocol frame is 4. Reference numeral 406 denotes the transport block bit map for a 1st soft handover branch, and reference 408 denotes a transport block bit map for a $2^{nd}$ soft handover branch. Each soft handover branch is associated with the particular radio link, and the respective transport block bit maps are provided in a frame protocol frame of the DCH or enhanced DCH in the respective branches.

Also generally designated by reference numeral 402 in FIG. 2 is a radio network controller, including a macro diversity combining entity 404. The implementation of a radio network controller will be well understood by one skilled in the art, as will the implementation of a macro diversity combining entity. Such elements are therefore not described in any detail herein. The invention does not propose a modification to such elements other than any modification or adaptation stated herein.

Figure 4:
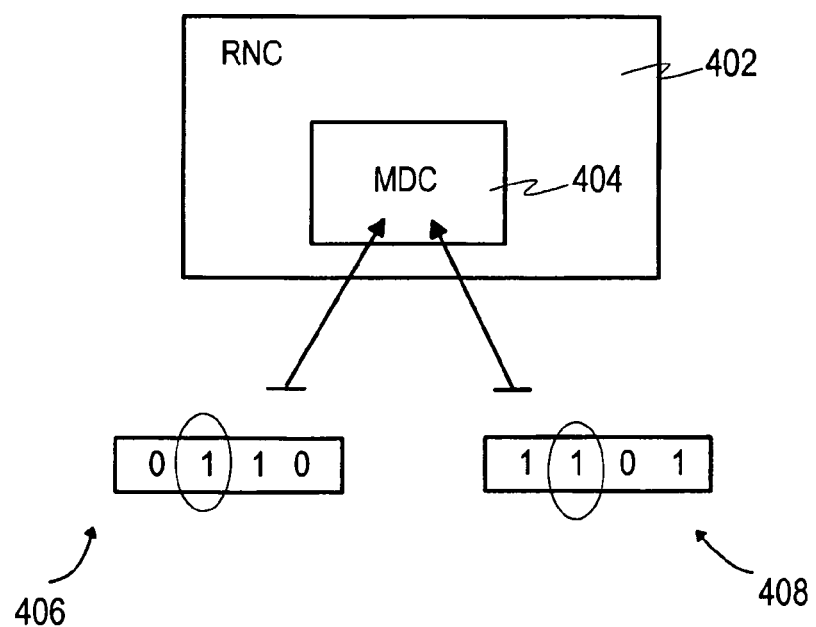
FIG. 4 illustrates an example application of an embodiment of the invention in a soft handover technique.

As can be seen in FIG. 4, the macro diversity combining entity is adapted to include a means for comparing the respective bits of the transport block bit map associated with each soft handover branch to determine the presence of common transport blocks. In FIG. 4, it is assumed that the software handover branch associated with the transport block bit map 406 includes only the $2^{nd}$ and $3^{rd}$ transport blocks, and therefore has a bit sequence of 0110. The soft handover branch associated with the transport block bit map 408 includes the $1^{st}$, $2^{nd}$ and $4^{th}$ transport blocks, and therefore has a bit sequence of 1101. As can be readily seen, in this simple example the only transport block common to each branch is the $2^{nd}$ transport block. Thus, only the $2^{nd}$ transport block is used for the combining process. The combining process may then proceed in accordance with standard techniques known in the art, which are not described in further detail herein.

It is preferable to additionally provide a signalling support for the transport block transport mechanism described herein in accordance with embodiments of the invention. The provision of signalling support is especially advantageous if the techniques described herein are provided as an optional feature. Where the techniques described herein are optional it may be preferable to signal from one end of a link to another end as to whether or not the selective inclusion technique discussed herein has been utilised. In such a way the far end of the link is notified as to whether to read a bit map. In the enhanced DCH set-up, the transport mode may preferably be signalled, giving an indication as to whether all transport blocks are included in a frame protocol frame, or only useful transport blocks are included. This information may be provided as part of the E-DCH information IE group in NBAP/RANAP.

The length of the bit map may be either fixed for all E-DCH or it may be of varying length. Where the bit map length varies, the length may vary depending on the maximum number of transport blocks per transport time interval for a given E-DCH.

In general, the Node B may be considered to be a network access point, being a point at which a user terminal, such as a user equipment or mobile terminal, accesses a network. In general, the radio network controller may be considered to be a network access controller, being an element which controls network access.

The invention has been described herein by way of reference to particular non-limiting examples. One skilled in the art will understand the general applicability of the invention. The scope of protection afforded by the invention is defined in the appended claims.

The invention claimed is:

1. A method, comprising:
   performing error control on a set of available data;
   selectively including data of the set of available data in a payload of a frame for sending on an enhanced dedicated channel from a network element to a network controller and excluding at the network element other data of the set of available data from the payload of the frame, said included and excluded data being different from one another, in dependence on an outcome of the error control performed on the set of available data;
   providing from the network element to the network controller an indication in said frame of which data of the set of available data is selectively included in the payload of the frame and which data of the set of available data is excluded by the network element from the payload of the frame; and
   forming a data frame at the network element for the data for transmission from the network element to the network controller in the dedicated channel of a mobile communication system, wherein the data frame is formed from the payload of the frame and a header of the frame.

2. A method according to claim 1, wherein the data comprises data sets or transport blocks.

3. A method according to claim 1, wherein the selectively including of data in the payload of the frame further comprises including data of the set of available data in the payload of the frame that passes the error control.

4. A method according to claim 1, wherein the indication comprises a bit map.

5. A method according to claim 4, wherein the bit map identifies the presence or absence of all data of the set of available data.

6. A method according to claim 4, wherein the bit map comprises a number of bits corresponding to a maximum amount of available data.

7. A method according to claim 1, wherein the indication is provided in the header of the frame.

8. A method according to claim 1, wherein the indication is provided in an extension of the frame.

9. A method according to claim 1, further comprising:
   comparing, in the network controller, an indication of selectively provided data in frames in at least two channels; and
   combining common data as part of a soft handover procedure.

10. A method according to claim 1, further comprising:
    transmitting signaling from the network element indicating whether a dedicated channel transports the selectively included data.

11. A method according to claim 10, wherein, responsive to an indication that the dedicated channel transports the selectively included data, the indication is retrieved from a transmitted frame at the network controller.

12. A network element for a communications network, the network element comprising:
    a processor configured to
    perform an error control on a set of available data,
    selectively include data of the set of available data in a payload of a frame for sending on an enhanced dedicated channel to a network controller and exclude other data of the set of available data from the payload of the frame, said included and excluded data being different from one another, dependent on an outcome of the error control performed on the set of available data,
    provide in said frame an indication of which data of the set of available data is selectively included in the payload of the frame and which data of the set of available data is excluded from the payload of the frame; and
    form a data frame from the payload of the frame and a header for transporting the selectively included data in a dedicated channel.

13. A network element according to claim 12, wherein the data comprises data sets or transport blocks.

14. A network element according to claim 12, wherein the processor is further configured to provide data of the set of available data in the payload of the frame that passes the error control.

15. A network element according to claim 12, wherein the indication comprises a bit map.

16. A network element according to claim 15, wherein the processor is further configured to generate the bit map in dependence on the presence or absence of all data of the set of available data.

17. A network element according to claim 15, wherein the processor is further configured to generate the bit map to comprise a number of bits corresponding to a maximum amount of available data.

18. A network element according to claim 12, wherein the processor is further configured to compare the indication of the selectively included data in frames in at least two channels, and to combine common data as part of a soft handover procedure.

19. A network element according to claim 12, further comprising:
a transmitter configured to transmit signaling indicating whether a dedicated channel comprises the selectively provided data.

20. A network element according to claim 12, wherein the network element comprises a network access point of a communication system.

21. A network element for a communications network, the network element comprising:
an encoder configured to encode a frame according to a frame protocol for an enhanced dedicated channel, wherein
the frame protocol comprises a header portion and a payload portion, the payload portion carrying a variable amount of payload data to be sent by the network element,
the payload data comprised in the payload portion comprises data selectively included from a set of available data by the network element and excludes other data of the set of available data, said included and excluded data being different from one another, in dependence on the outcome of error control performed on the set of available data by the network element, and
the frame comprises an indication of which data of the set of available data is selectively included in the payload and which data of the set of available data is excluded from the payload.

22. A network element according to claim 21, wherein the data comprises data sets or transport blocks.

23. A network element according to claim 21, wherein the indication is comprised in the header portion.

24. A network element according to claim 21, wherein the indication is comprised in an extension portion of the frame protocol.

25. A network element according to claim 21, wherein the indication comprises a bit map.

26. A network element according to claim 21, wherein the network element comprises a network access point of a communication system.

27. A computer program embodied on a non-transitory computer-readable storage medium on a network element of a communications network, the program configured to control a processor in the network element to perform a process, the process comprising:
performing error control on a set of available data;
selectively including data of a set of available data in a payload of a frame for sending to a network controller on an enhanced dedicated channel and excluding other data of the available set of data from the payload of the frame, said included and excluded data being different from one another, in dependence on the outcome of the error control performed on the set of available data;
providing to the network controller an indication in said frame of which data of the set of available data is selectively included in the payload of the frame and which data of the set of available data is excluded from the payload of the frame; and
forming a data frame at the data for transmission from he network element to the network controller in the dedicated channel of a mobile communication system, wherein the data frame is formed from the payload of the frame and a header of the frame.

28. A computer program according to claim 27, wherein the data comprises data sets or transport blocks.

29. A computer program according to claim 27, wherein the selectively including data in the payload of the frame further comprises providing data of the set of available data in the payload of the frame that passes the error control.

30. A computer program according to claim 27, wherein the indication comprises a bit map.

31. A computer program according to claim 30, wherein the bit map identifies the presence or absence of all data of the set of available data.

32. A computer program according to claim 30, wherein the bit map comprises a number of bits corresponding to a maximum amount of available data.

33. A computer program according to claim 27, wherein the indication is provided in a header of the frame.

34. A computer program according to claim 30, wherein the indication is provided in an extension of the frame.

35. A computer program according to claim 30, the process further comprising:
comparing an indication of selectively included data in frames in at least two channels; and
combining common data as part of a soft handover procedure.

36. A computer program according to claim 30, the process further comprising:
transmitting signaling indicating whether a dedicated channel transports the selectively included data.

37. A computer program according to claim 36, wherein, responsive to an indication from the network element that the dedicated channel transports selectively included data, the indication is retrieved from a transmitted frame at the network controller.

38. A network controller for a communications network, the network controller comprising:
a decoder configured to decode a frame received from a network element on an enhanced dedicated channel according to a frame protocol for the enhanced dedicated channel, wherein
the frame protocol comprises a header portion and a payload portion, the payload portion carrying a variable amount of payload data,
the payload data comprised in the payload portion includes data selected from a set of available data by the network element and excludes other data of the set of available data, said included and excluded data being different from one another, in dependence on the outcome of error control performed on the set of available data by the network element, and
the frame comprises an indication of which data of the set of available data is selectively included in the payload and which data of the set of available data is excluded from the payload by the network element.

39. A network controller according to claim 38, wherein the data comprises data sets or transport blocks.

40. A network controller according to claim 38, wherein the indication is comprised in the header portion.

41. A network controller according to claim 38, wherein the indication is comprised in an extension portion of the frame protocol.

42. A network controller according to claim 38, wherein the indication comprises a bit map.

43. A network controller according to claim 38, wherein the network controller comprises a network access controller of a communication system.

44. A method, comprising:
encoding a frame in a network element according to a frame protocol for an enhanced dedicated channel, wherein the frame protocol comprises a header portion and a payload portion, the payload portion carrying a variable amount of payload data, wherein the payload data comprised in the payload portion comprises data selected from a set of available data by the network element and excludes other data of the set of available data, said selected and excluded data being different from one another, in dependence on the outcome of error control performed by the network element on the set of available data, and the frame comprises an indication of which data of the set of available data is selectively included in the payload and which data of the set of available data is excluded from the payload.

45. A method according to claim 44, wherein the data comprises data sets or transport blocks.

46. A method according to claim 44, wherein the indication is comprised in the header portion.

47. A method according to claim 44, wherein the indication is comprised in an extension portion of the frame protocol.

48. A method according to claim 44, wherein the indication comprises a bit map.

49. A method, comprising:
decoding in a network controller a frame received from a network element on an enhanced dedicated channel according to a frame protocol for the enhanced dedicated channel, wherein the frame protocol comprises a header portion and a payload portion, the payload portion carrying a variable amount of payload data, wherein the payload data comprised in the payload portion comprises data selected from a set of available data by the network element and excludes other data of the set of available data, said selected and excluded data being different from one another, in dependence on the outcome of error control performed by the network element on the set of available data, and the frame comprises an indication of which data of the set of available data is selectively included in the payload and which data of the set of available data is excluded from the payload by the network element.

50. A method according to claim 49, wherein the data comprises data sets or transport blocks.

51. A method according to claim 49, wherein the indication is comprised in the header portion.

52. A method according to claim 49, wherein the indication is comprised in an extension portion of the frame protocol.

53. A method according to claim 49, wherein the indication comprises a bit map.

* * * * *